United States Patent Office 3,748,337
Patented July 24, 1973

3,748,337
COPPER SALTS OF BIS(ARYLENOTRIAZOLE)DI-
PHENYLDICARBOXYLIC ACID USEFUL AS
HEAT STABILIZERS FOR POLYAMIDES
Hubert Linares, Lyon, France, assignor to Rhone-Poulenc
S.A., Paris, France
No Drawing. Filed Mar. 9, 1971, Ser. No. 122,534
Claims priority, application France, Mar. 11, 1970,
7008724
Int. Cl. C07d 55/04
U.S. Cl. 260—299          8 Claims

ABSTRACT OF THE DISCLOSURE

Polyamides, especially polyhexamethylene adipamide, are stabilized against the adverse effects, especially yellowing, of heat treatments such as heat setting by incorporation of a copper salt of a bis(arylenotriazole)diphenyldicarboxylic acid.

---

The present invention relates to heat stabilisers for polyamides.

Heat stabilisation of polyamide fibres is industrially essential because it is necessary, after the spinning, stretching and desizing processes, to heat-set the filaments to stabilise their mechanical properties. During this operation, which is generally carried out at a temperature of about 200° C. (the exact temperature being chosen in accordance with the nature of the fibre), polyamides tend to yellow and their mechanical properties deteriorate. These phenomena are particularly marked in the case of polyhexamethylene adipamide, for which the heat-setting operation is often carried out at about 210° C.

Heat stabilisers can be incorporated into polyamides during or after their polymerisation. The former of these procedures is preferable, because incorporation after polymerisation necessarily involves a supplementary treatment which increases costs. However, currently known heat stabilisers which can be incorporated before polymerisation and do not themselves deteriorate during the polymerisation process are coloured, and cannot therefore be used in the production of pure white textiles.

The present invention provides a new class of heat stabilisers which can be incorporated during polymerisation, and which stabilise polyamides during heat-setting, and allow pure white textiles to be obtained therefrom.

The new heat-stabilisers of the invention are the copper salts of the formula:

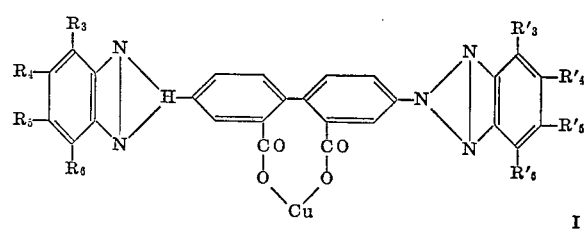

I in which $R_3$, $R_4$, $R_5$, and $R_6$ and $R'_3$, $R'_4$, $R'_5$, and $R'_6$ each represent hydrogen or alkyl of 1 to 6 carbon atoms, not more than two of $R_3$, $R_4$, $R_5$, and $R_6$ or of $R'_3$, $R'_4$, $R'_5$, and $R'_6$ being alkyl, or $R_3$ and $R_4$, $R_4$ and $R_5$, $R_5$ and $R_6$, $R'_3$ and $R'_4$, $R'_4$ and $R'_5$, or $R'_5$ and $R'_6$, together with the benzene ring to which they are attached, represent a naphtho, anthraceno, or phenanthreno group, the remainder of the substituents on the same benzene ring being hydrogen, or $R_3$, $R_4$, $R_5$ and $R_6$, or $R'_3$, $R'_4$, $R'_5$ and $R'_6$, together with the benzene ring to which they are attached, represent a phenanthreno group. These new salts are symmetrical and the groups

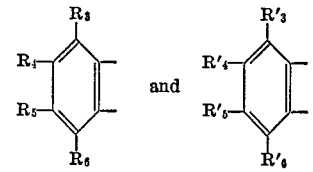

have one of the following structures:

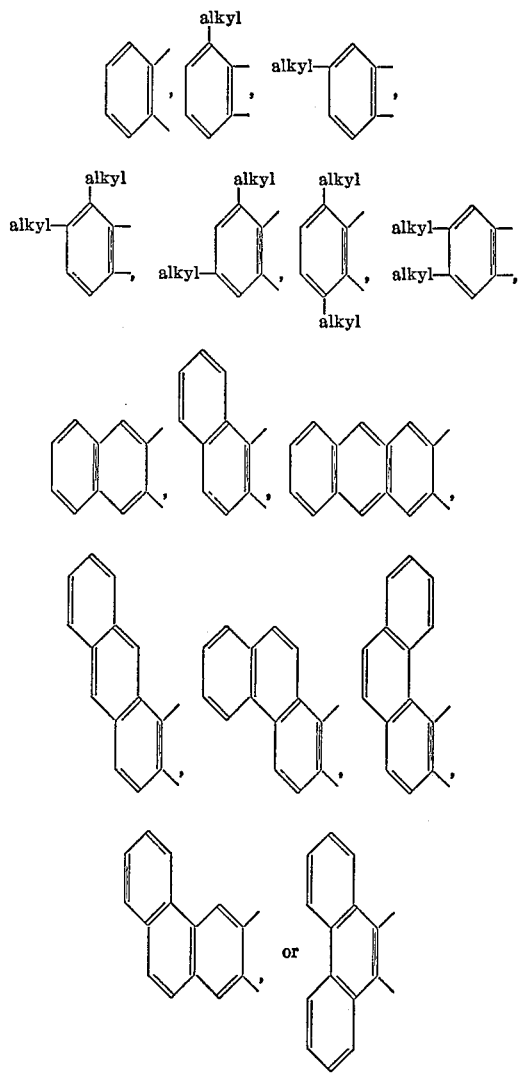

Preferably the radicals $R_3$, $R_4$, $R_5$ and $R_6$ form an aromatic system or represent hydrogen atoms or methyl or ethyl radicals. The radicals $R'_3$, $R'_4$, $R'_5$ and $R'_6$ are respectively identical with the radicals $R_3$, $R_4$, $R_5$ and $R_6$.

The copper salts of the following acids are examples of heat-stabilizers in accordance with the invention:

4,4'-bis(benzo[1,2-d]triazole)diphenyl-2,2'-dicarboxylic acid;
4,4'-bis(4-methyl-benzo[1,2-d]triazole)diphenyl-2,2'-dicarboxylic acid;
4,4'-bis(naphtho[1,2-d]triazole)diphenyl-2,2'-dicarboxylic acid;
4,4'-bis(anthraceno[1,2-d]triazole)diphenyl-2,2'-dicarboxylic acid;
4,4'-bis(phenanthreno[2,3-d]triazole)diphenyl-2,2'-dicarboxylic acid;

4,4'-bis(phenanthreno[1,2-d]triazole)diphenyl-2,2'-dicarboxylic acid; and 4,4'-bis(phenanthreno[9,10-d]triazole)diphenyl-2,2'-dicarboxylic acid.

The compounds of Formula I can be prepared from 4,4' - amino-diphenyl - 2,2' - dicarboxylic acids of formula:

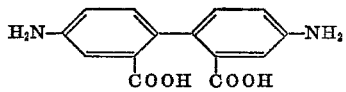

II

The acids of Formula II are diazotized at both amine groups with nitrous acid in a hydrochloric acid medium. The bis-diazo derivative obtained is then coupled in conventional manner to an arylamine of formula:

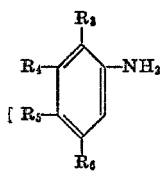

III to yield a 4,4'-bis(arylazo)diphenyl-2,2'-dicarboxylic acid of formula:

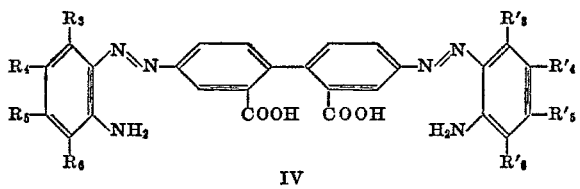

IV

The acid of Fourmula IV is then directly converted into the cupric salt of the 4,4'-bis(arylenotriazole)diphenyl-2,2'-dicarboxylic acid of Formula I by oxidation with a cupric salt such as copper sulphate by the procedure described in Methoden der Organischen Chemie, Houben-Weyl, volume 10–3, page 425.

The copper salts of Formula I can, as already stated, be used to stabilise polyamide fibres during heat-setting. They are especially suitable for stabilising polyamides obtained by polycondensation of diacids and diamines which are aliphatic. Polyhexamethylene adipamide is the industrially most important of such polyamides, and the new stabilisers are very valuable heat-stabilisers for fibers made of this polyamide, because they make it possible for such fibres to be heat-set without adverse effect on their mechanical properties or significant yellowing of them.

The new stabilisers can be used by any known process, for example by coating polyamide particles before spinning, or by impregnating filaments in a bath after spinning, but they are preferably directly incorporated with the monomers during the polycondensation. Other stabilisers previously used for polyamides may optionally be added also.

Especially when the stabiliser is incorporated with the monomer or monomers before polymerisation, the proportion used is generally 0.005% to 0.5% relative to the weight of monomers employed. These limits are not critical. However, the use of too low a content does not have the desirable effect, while too high a content carries the risk of causing colouration of the fibre. In practice, the preferred content are between 0.01% and 0.2% by weight.

The stabilisation effect against yellowing caused by the salts of Formula I, which allows a pure white textile to be obtained, apart from being obvious on simple visual examination, can be demonstrated by any apparatus which can be used to measure whiteness and yellowness. See, for example, the methods described by Wright in "Measurement of Colour," published by Hilger and Watts, 3rd edition, pages 96 to 127 (1964).

The examples which follow illustrate the invention. Temperatures are in degrees centigrade (Celsius).

EXAMPLE 1

Preparation of 4,4'-bis(naphthylazo)-diphenyl-2,2'-dicarboxylic acid 66.6 of 4,4'-diamino-diphenyl-2,2'-dicarboxylic acid, 116 ml. of hydrochloric acid (density 1.18) and 318 ml. of distilled water are introduced into a 3 litre flask. The mixture is cooled to 0° and a solution of sodium nitrite consisting of 34.5 g. of nitrite and of 83 ml. of distilled water is run in over the course of 1 hour. When the addition is complete, the mixture is kept at between 0 and 2° for 1 hour with stirring, and the excess nitrite is then destroyed by adding sulphamic acid. The destruction of the nitrite is complete when an iodide-starch indicator paper is no longer coloured by a small sample of the reaction mixture.

97 g. of 2-naphthylamine hydrochloride are dissolved, at about 60°, in an aqueous acid solution of 1260 ml. of distilled water and 2.5 ml. of hydrochloric acid (density 1.18). The solution obtained is run into the reaction flask containing the diazonium salt over the course of 50 minutes and at about 8–10°. When the addition is complete, 408 g. of sodium acetate are added over the course of about 1 hour.

The reaction flask now contains 4,4'-bis-(naphthylazo)-diphenyl-2,2'-dicarboxylic acid (Compound I), which is filtered off, washed with water and then with diethyl ether, and dried in vacuo at 40° for 12 hours. 124.4 g. of (I), melting with decomposition at 268–270°, are thus obtained.

4,4' - diamino-diphenyl-dicarboxylic acid was obtained by the method described by H. R. Patel (J. Amer. Pharm. Assoc. 46, 51 (1957)).

Preparation of the copper salt of 4,4'-bis(naphtho[1,2-d]triazole)-diphenyl-2,2'-dicarboxylic acid The whole of the compound (I) (124.4 g.) is dissolved in 3760 ml. of anhydrous pyridine in a 10 l. flask, and a solution of 258 g. of hydrated copper sulphate, 1030 ml. of distilled water and 515 ml. of an aqueous solution of ammonia (density: 0.92) is then slowly added. The mixture is heated under reflux for 10 hours (at 90°) and then cooled. The precipitate obtained is filtered off and washed with water until the odour of pyridine has disappeared, and then with dimethylformamide, water and alcohol. 75.5 g. of the copper salt of 4,4'-bis(naphtho-[1,2-d]triazole)-diphenyl-2,2'-dicarboxylic acid (II) are thus obtained. This compound (II) is characterised by microanalysis, and its infra-red spectrum (main bands corresponding to the carboxyl groups at 1600 and 1380 cm.$^{-1}$, and main band corresponding to the triazole nucleus at 970 cm.$^{-1}$). By hydrolysis in an aqueous medium, the free acid is obtained, which absorbs ultraviolet radiation at wavelengths of 360–350–342 nm. (molecular coefficient of absorption of the order of 50,000 at each wavelength). The acid re-emits the ultraviolet light absorbed, principally in the form of visible radiation at 395 nm.

EXAMPLE 2

2620 g. of hexamethylenediammonium adipate in the form of a 50% aqueous solution, 33 g. of pure acetic acid, 1.02 g. of the copper salt of 4,4'-bis(naphtho[1,2-d]triazole) - diphenyl - 2,2' - dicarboxylic acid prepared as in Example 1, and 5 cm.$^3$ of an aqueous suspension of an anti-foaming agent are introduced into an autoclave. The mixture is heated to 218° over the course of 1 hour 15 minutes. The autoclave is then degassed, ad 192. g. of an aqueous 20% by weight suspension of titanium dioxide are introduced. The mixture is heated at 275° for 30 minutes, and the polymer then run into water.

The polymer, which shows a slightly pinkish shade, is extruded through a spinneret so as to obtain strands of 3.3 dtex unit gauge. A woven fabric is produced from these strands, and subjected to a heat treatment of from 30 seconds to 5 minutes in dry air at 210°. After 2 minutes heating the yellowing is hardly noticeable. For a treatment of one minute, no yellowing is visible.

The same test was carried out without incorporating the heat protection agent. It was then found that considerable yellowing of the fibre occurred even for less than 2 minutes heating at 210°.

EXAMPLE 3

Granules of polyhexamethylene adipamide containing 1.7% of titanium dioxide (parallelepiped shaped granules of dimensions substantially about 10- 5-3 mm.) and 0.1% of the copper salt of 4,4'-bis(naphtho[1,2-d]triazole)-diphenyl-2,2'-dicarboxylic acid are mixed at ambient temperature. It is found that the copper salt distributes itself substantially uniformly over the granules. The mixture is then micro-spun to yield filaments of 8 strands of about dtex, which are wound up into hanks. These hanks are heat-set at 210° in a stream of air, by passing them through a vertical oven for 1 minute 30 seconds. The hanks do not appear yellow to the naked eye.

After this operation, the filaments are cut into strands of 1 cm. length, suspended in water, and filtered off on a Buchner filter (diameter 50 mm.). The diameter of the disc of tangled filaments thus obtained corresponds to the internal diameter of the measuring cell of the Zeiss "Elrepho" photocolorimeter, which is used to determine the degree of yellowness of the filaments.

To carry out the measurement, the Elrepho photocolorimeter is equipped with a spherical capsule and for each sample the coefficients of diffuse reflection using the FMXC, FMYC and FMZC filters are measured. The degree of yellowness is expressed by the term $$\frac{Rx - Rz}{Ry}$$

wherein $Rx$, $Ry$ and $Rz$ are the coefficients of reflection measured across the three filters, namely red, green and blue-violet (Measurement of Colour—Wright—published by Hilger and Watts, 3rd. edition, pages 96 to 127 (1964)).

The degree of yellowness is 0.06, while a comparison sample which has been heat-set without a heat protection agent shows a yellowness index of 0.109. The comparison fibre is noticeably yellow to the naked eye.

I claim:
1. A copper salt of the formula:

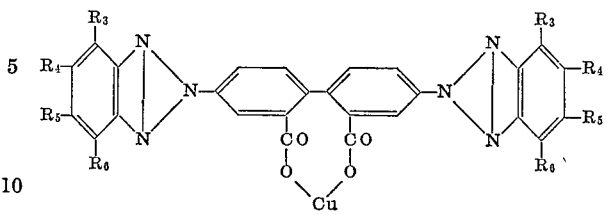

in which $R_3$, $R_4$, $R_5$ and $R_6$ each represent hydrogen or alkyl of 1 to 6 carbon atoms, not more than two of $R_3$, $R_4$, $R_5$ and $R_6$ being alkyl, or $R_3$ and $R_4$, $R_4$ and $R_5$, or $R_5$ and $R_6$, together with the benzene ring to which they are attached, represent a naphtho, anthraceno, or penanthreno group, the remainder of the substituents on the same benzene ring being hydrogen, or $R_3$, $R_4$, $R_5$, and $R_6$, together with the benzene ring to which they are attached, represent a phenanthreno group.

2. The copper salt according to claim 1 of 4,4'-bis(benzo[1,2-d]triazole)-diphenyl-2,2'-dicarboxylic acid.

3. The copper salt according to claim 1 of 4,4'-bis(4-methylbenzo[1,2-d] - triazole)-diphenyl-2,2'-dicarboxylic acid.

4. The copper salt according to claim 1 of 4,4'-bis-(nephtho[1,2-d]triazole)-diphenyl-2,2'-dicarboxylic acid.

5. The copper salt according to claim 1 of 4,4'-bis-(anthraceno[1,2-d]triazole) - diphenyl - 2,2'-dicarboxylic acid.

6. The copper salt according to claim 1 of 4,4'-bis-(phenanthreno[2,3-d]triazole - diphenyl-2,2'-dicarboxylic acid.

7. The copper salt according to claim 1 of 4,4'-bis (phenanthreno[1,2-d]triazole) - diphenyl - 2,2' - dicarboxylic acid.

8. The copper salt according to claim 1 of 4,4'-bis-(phenanthreno[9,10-d]triazole) - diphenyl - 2,2' - dicarboxylic acid.

References Cited
UNITED STATES PATENTS

| | | | |
|---|---|---|---|
| 3,074,910 | 1/1963 | Dickson | 260—299 |
| 3,267,113 | 8/1966 | Carboni | 260—299 |
| 3,600,397 | 8/1971 | Seki et al. | 260—299 |

RICHARD J. GALLAGHER, Primary Examiner

U.S. Cl. X.R.

260—45.75 C, 181, 308 B